US006971546B2

(12) United States Patent
Costa (10) Patent No.: US 6,971,546 B2
(45) Date of Patent: Dec. 6, 2005

(54) DISPENSER OF SINGLE-USE PORTIONS OF PREPARATIONS FOR BEVERAGES, PARTICULARLY COFFEE OR THE LIKE

(76) Inventor: Marc Robert Costa, Via Giovanni Cacchioli, 43043 Borgo Val di Taro (IT)

( * ) Notice: Subject to any disclaimer, the term of this patent is extended or adjusted under 35 U.S.C. 154(b) by 74 days.

(21) Appl. No.: 10/354,186

(22) Filed: Jan. 30, 2003

(65) Prior Publication Data

US 2003/0146237 A1 Aug. 7, 2003

(30) Foreign Application Priority Data

Feb. 1, 2002 (IT) .......................... MO2002A0022
Dec. 12, 2002 (IT) .......................... MO2002A0354

(51) Int. Cl.[7] .............................................. B65G 59/00
(52) U.S. Cl. ....................... 221/297; 221/298; 221/299
(58) Field of Search ............................... 221/297, 299, 221/301, 258

(56) References Cited

U.S. PATENT DOCUMENTS

| 4,423,828 A | * | 1/1984 | Tanaka et al. ............... 221/129 |
| 4,601,160 A | * | 7/1986 | Heisler ......................... 53/485 |
| 5,167,345 A | * | 12/1992 | Bleeker ........................ 221/17 |
| 5,667,096 A | * | 9/1997 | Wu ................................ 221/6 |
| 6,138,868 A | * | 10/2000 | Yuyama et al. .......... 221/312 R |
| 6,163,736 A | * | 12/2000 | Halfacre ...................... 700/232 |
| 6,240,832 B1 | | 6/2001 | Schmed et al. |
| 6,513,679 B2 | * | 2/2003 | Greenwald et al. ......... 221/287 |

FOREIGN PATENT DOCUMENTS

EP 1 089 240 4/2001

OTHER PUBLICATIONS

Patent Abstracts of Japan vol. 1995, No. 05, Jun. 30, 1995 & JP 07 037158 A (Fuji Electric Co Ltd), Feb. 7, 1995 *abstract*.

* cited by examiner

Primary Examiner—Eileen D. Lillis
Assistant Examiner—Rashmi Sharma
(74) Attorney, Agent, or Firm—Guido Modiano; Albert Josif; Daniel O'Byrne (57) ABSTRACT

A dispenser of single-use portions of preparations for beverages, comprising a structure that supports at least one storage assembly for single-use portions provided with a discharge outlet for the discharge of the portions, at least one distribution assembly for the portions which is provided with an outlet for dispensing said portions and with a device for transferring the portions from the discharge outlet to the dispensing outlet, which are interposed between the storage assembly and the distribution assembly.

27 Claims, 8 Drawing Sheets

DISPENSER OF SINGLE-USE PORTIONS OF PREPARATIONS FOR BEVERAGES, PARTICULARLY COFFEE OR THE LIKE

BACKGROUND OF THE INVENTION

The present invention relates to a dispenser of single-use portions of preparations for beverages, particularly coffee or the like.

Automatic machines for preparing beverages, particularly coffee, are known which are used in bars, restaurants and public premises in general and are usually provided with a unit for feeding and dosing the preparations for the beverages.

In the case of coffee, for example, the feeding and dosage unit is substantially constituted by a hopper for containing the coffee, in beans, if a grinding unit is also provided, or already ground in powder form; said hopper is provided in a lower region with an outlet that has a closing and opening device.

The coffee that fills the hopper is supplied in packages, such as bags or tin containers, which have to be opened to pour their contents into the hopper; these operations are usually performed, for example by using scissors or knives, often in the presence of the public constituted by consumers, and give the impression of a poor hygiene and lack of safety.

Inside the hopper, the coffee, by remaining in contact with the air contained in said hopper, oxidizes, is contaminated and loses part of its initial aroma, depriving the beverages prepared with it of taste and fragrance; this unwanted effect worsens as the rate at which said coffee is consumed decreases.

It is also known to use single-use portions of preparations for beverages, particularly coffee, barley or the like, commonly known as filter, which are constituted by two wafers of porous paper-like material which are mutually superimposed and sealed along their outer perimetric edge and between which a predefined dose of preparation (for example of a mixture of coffee) required to prepare one or more cups of beverage is retained.

The individual single-use portions can be manufactured one by one and packaged individually in sealed sachets in a controlled atmosphere: at the time of use, an operator manually opens a single sachet and, again manually, removes the portion contained therein to place it in the so-called filter holder of the automatic machine, from which it receives hot water.

As an alternative, the single-use portions are packaged in continuous ribbons that are closed in bags which, once opened, are arranged inside an automatic machine, where there is a loading device which, at each use, causes the ribbon to advance toward the filter holders by an extent that is equal to one portion.

However, even single-use portions of a known type have drawbacks, including the fact that they are scarcely hygienic; the individual portions or the ribbon of portions must in fact be handled by operators in order to prepare the beverages and/or be inserted in an automatic machine.

Another disadvantage of known single-use portions is that they are not practical enough to be used in public premises where rapid and prompt service is required; a considerable amount of time is in fact wasted every time one has to open a sachet or replace a ribbon.

Finally, in the case of portions packaged in a ribbon, the portions of the ribbon that are still to be used are exposed to the air; accordingly, the preparation they contain oxidizes, is contaminated and loses aroma and fragrance, and said losses increase as the rate of consumption of said ribbon decreases.

SUMMARY OF THE INVENTION

The aim of the present invention is to eliminate the drawbacks noted above, by providing a dispenser of single-use portions of preparations for beverages, particularly coffee or the like, that allows to ensure good preservation of the preparations so that they are not contaminated and/or oxidized and do not lose aroma and freshness.

Another object of the invention is to provide a dispenser that allows to improve the hygiene, practicality and speed of use of single-use portions particularly in bars, restaurants and public premises.

Another object of the present invention is to provide a dispenser that allows to eliminate direct handling of the portions on the part of operators, providing better respect and protection of the health of the public constituted by consumers.

Within this aim, another object of the present invention is to provide a dispenser that is simple, relatively easy to provide in practice, safe in use, effective in operation, and has a relatively low cost.

This aim and these and other objects that will become better apparent hereinafter are achieved by the present dispenser of single-use portions of preparations for beverages, characterized in that it comprises a structure that supports at least one assembly for the storage of single-use portions that is provided with a discharge outlet for said portions, at least one assembly for distributing said portions that is provided with a dispensing outlet for said portions, and means for transferring the portions from said discharge outlet to said dispensing outlet, said means being interposed between said storage assembly and said distribution assembly.

BRIEF DESCRIPTION OF THE DRAWINGS

Further characteristics and advantages of the present invention will become better apparent from the following detailed description of a preferred but not exclusive embodiment of a dispenser of single-use portions of preparations for beverages, particularly coffee of the like, illustrated only by way of non-limitative example in the accompanying drawings, wherein.

DESCRIPTION OF THE PREFERRED EMBODIMENTS

With reference to the figures, the reference numeral 1 generally designates a dispenser of single-use portions P of preparations for beverages, particularly infusion beverages such as coffee or the like.

The dispenser 1 comprises a structure 2 that supports at least one storage assembly 3 for portions P, which is provided with a discharge outlet 4 for discharging the portions P and below which there is at least one distribution assembly 5 provided with a dispensing outlet 6 for dispensing the portions P to a collection device such as a filter holder F.

Means 7 for transferring the portions P from the discharge outlet 4 to the dispensing outlet 6 are interposed between the storage assembly 3 and the distribution assembly 5.

With reference to the first embodiment of the dispenser 1 shown in FIGS. 1 to 12, the structure 2 comprises a supporting base 8 from which a support 9 rises; the support supports the distribution assembly 5 and the storage assembly 3, with the interposition of a separation block 10, and a housing that is divided into two or more detachable portions 11 and 12.

Figure 1:
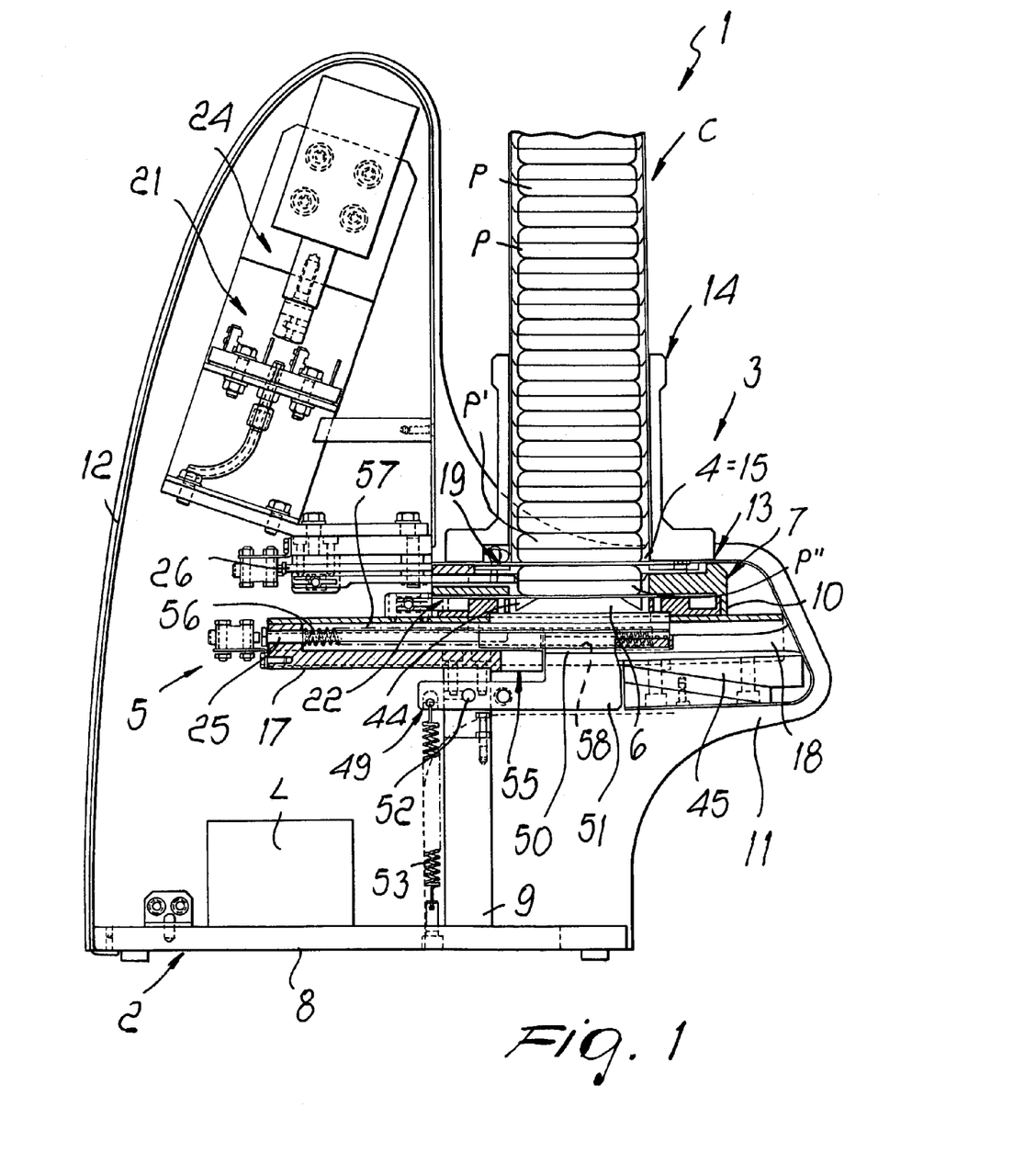
FIG. 1 is a schematic sectional side view of a first embodiment of the dispenser according to the invention.
Figure 2:
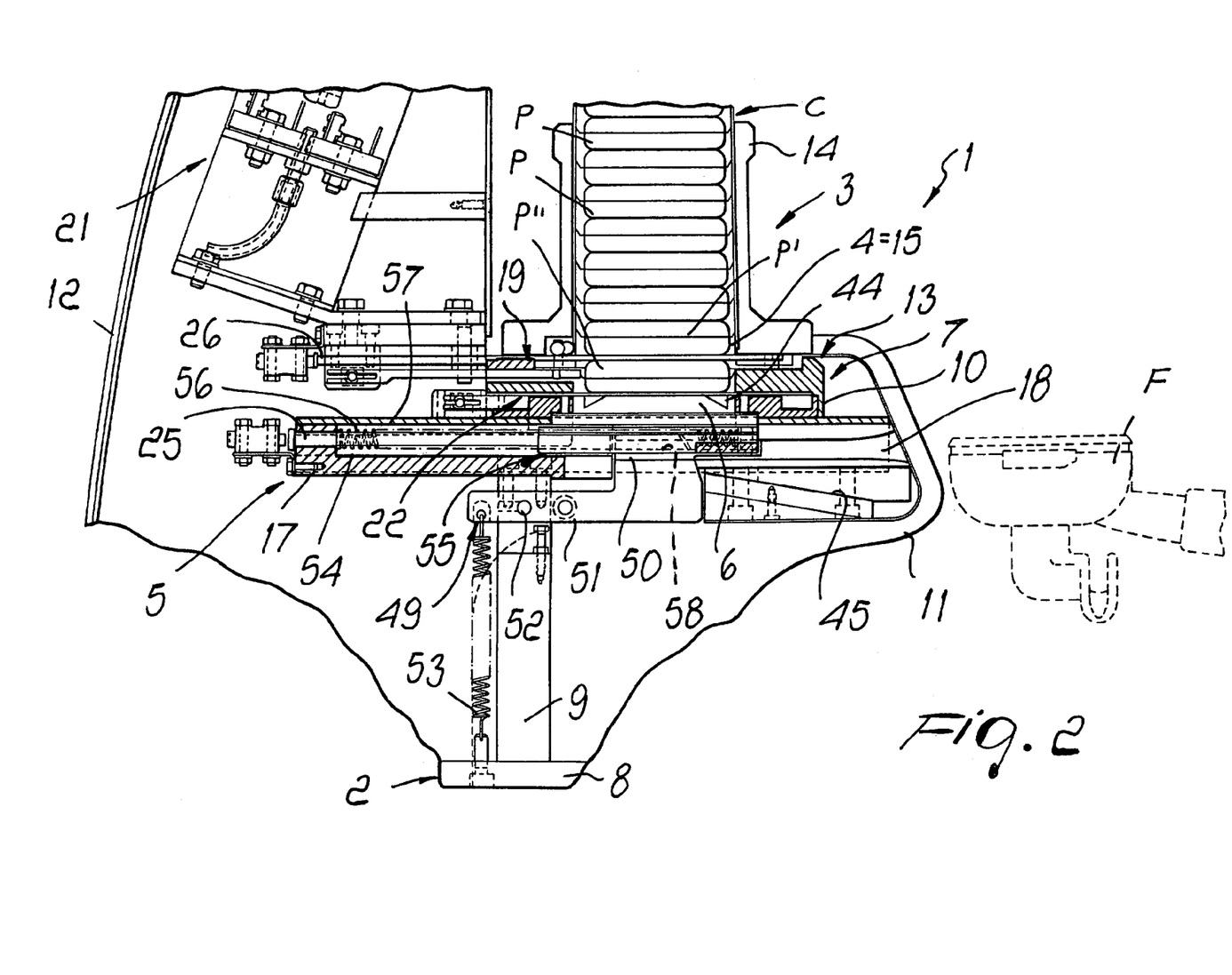
FIG. 2 is an enlarged-scale view of a detail of FIG. 1.

The storage assembly 3 comprises a plate 13, with which a fixed or removable support 14 for supporting at least one container C of mutually stacked portions P is associated.

The plate 13 can, for example, be formed by the structure 2 itself or by an optional spacer.

The discharge outlet 4 is formed in the support 14, which is for example a sleeve or bush for containing the container C; at one end, the container C in turn has an opening 15 that is suitable to be arranged at the discharge outlet 4 and is closed temporarily by a closure element such as a film 16 that can be removed by peeling before or after positioning said container C in the support 14, as described hereinafter.

Figure 3:
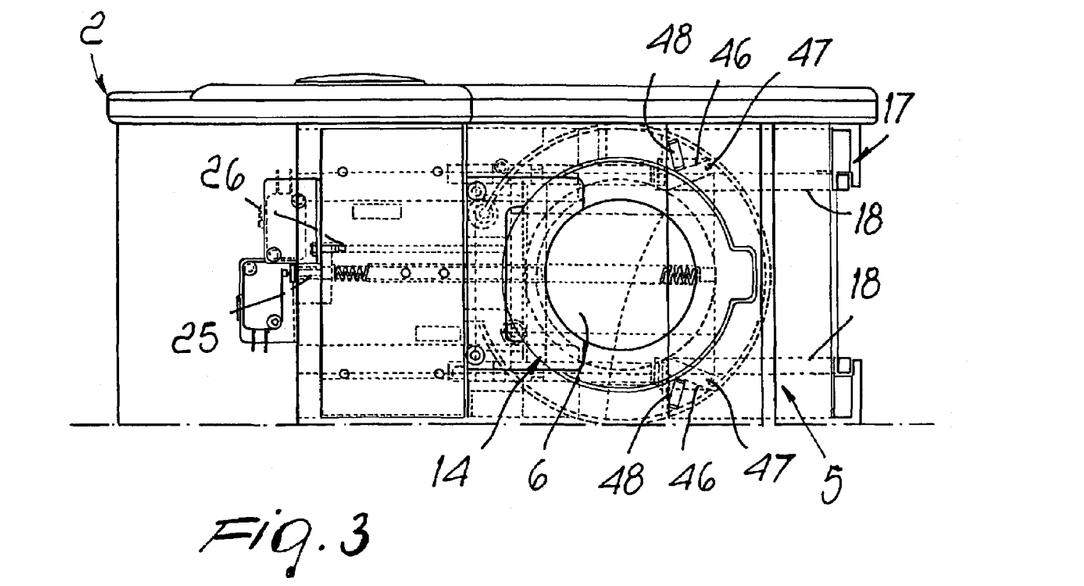
FIG. 3 is a schematic plan view, partially in phantom lines, of the distribution assembly of the dispenser of FIG. 1.

The distribution assembly 5 comprises a surface 17 in which the dispensing outlet 6 is formed; the dispensing outlet is provided with straight entry guides 18 for guiding, from the outside toward the dispensing outlet 6, the filter holder F for collecting the portions P dispensed individually by the dispenser 1.

The transfer means 7 comprise a first shutter 19 for the discharge outlet 4, which is associated, with first control means 20 interposed, with first actuation means 21, which are suitable to move it alternately from a configuration for closing the discharge outlet 4 to a configuration for opening said discharge outlet, and a second shutter 22 for the dispensing outlet 6, which is associated, with second control means 23 interposed, with second actuation means 24, which are suitable to move it alternately from a configuration for closing the dispensing outlet 6 to a configuration for opening said dispensing outlet.

The dispenser 1 further comprises first means for sensing and indicating the presence, proximate to the dispensing outlet 6, of the filter holder F, said means being constituted for example by a first feeler 25, and second means for sensing and indicating the presence, proximate to the discharge outlet 4, of the support 14 or of the container C, which are constituted for example by a second feeler 26.

The first and second feelers 25 and 26 detect by contact the presence, respectively, of the filter holder F and of the support 14 or of the container C; however, alternative embodiments of the first and second sensing indication means, such as for example magnetic proximity sensors, are also possible.

Both the first and the second actuation means 21 and 24 and the first and second feelers 25 and 26 are functionally controlled by a control and driving unit L.

The dispenser 1 assumes an inactive or standby configuration, in which it does not dispense the portions P, the filter holder F being moved away from the dispensing outlet 6, and an active configuration, in which it dispenses a single portion P at a time, which is collected by the filter holder F arranged at the dispensing outlet 6.

In the inactive configuration, both the first shutter 19 and the second shutter 22 are kept in the closed configuration by the control unit.

In the active configuration, instead, the control unit controls and coordinates the first and second actuation means 21 and 24 to move the first and second shutters 19 and 22 alternately, selectively and at different times between the respective closed and open configurations and vice versa in order to separate, through the discharge outlet 4, the portion P' at the base of the stack closed in the container C and single it (or isolate it) between the two shutters 19 and 22 to subsequently release it, through the dispensing outlet 6, to the filter holder F.

Figure 4:
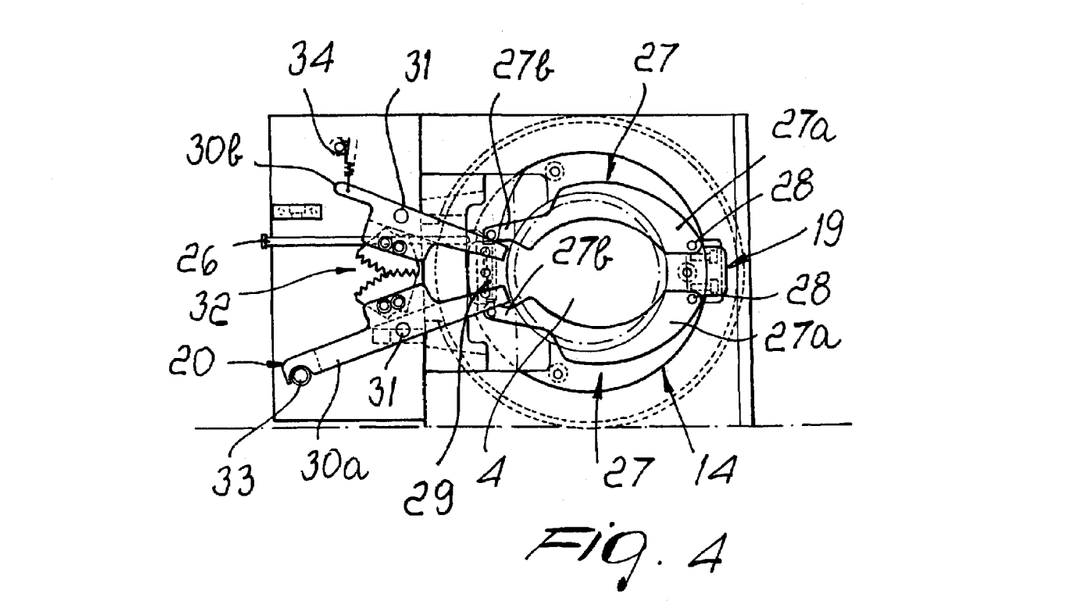
FIG. 4 is a plan view of the first shutter of the dispenser of FIG. 1 in the configuration in which the discharge outlet is closed.
Figure 5:
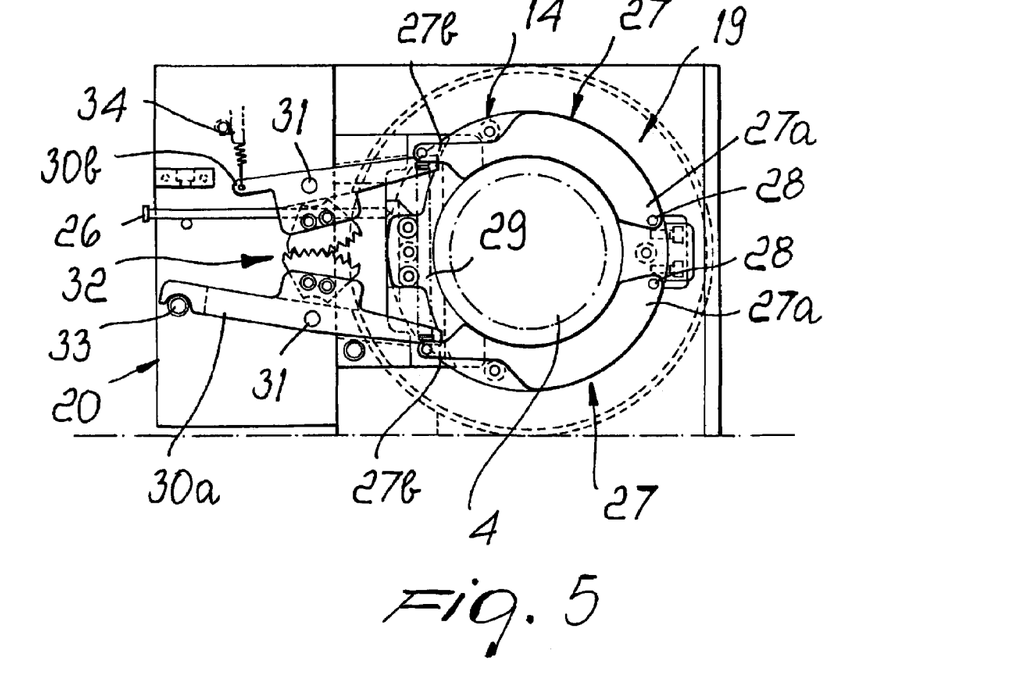
FIG. 5 is a plan view of the first shutter of the dispenser of FIG. 1 in the configuration in which the discharge outlet is open.

In the embodiment shown in said figures, the first shutter 19 comprises two laminas 27, or annular sectors, which are arranged so as to be substantially mutually co-planar below the discharge outlet 4; each lamina has an end 27a that is pivotally associated, about an axis that is substantially perpendicular thereto and is formed by a respective articulation pivot 28, with the plate 13 of the structure 2, and the opposite end 27b of said lamina is respectively associated with the end of a traction spring 29.

In the closed configuration, the two laminas 27 are arranged at the discharge outlet 4 so as to close it at least partially; in the open configuration, the two laminas 27 are moved away from the discharge outlet 4 for the passage of the portion P' alone through the discharge outlet.

The first control means 20 are of the type of a lever system which comprises a pair of levers 30a and 30b, which are pivoted about a respective fulcrum 31 and whose oscillations are coordinated by a coupling gear 32; the respective load-bearing ends of the two levers 30a and 30b are associated and interposed between the ends 27b of the laminas 27, and their active ends are respectively associated with an actuation pivot 33 and with a return spring 34.

The first actuation means 21 can be constituted by linear actuators of the type with electromagnets or electric servomotors and/or can comprise step motors that act on the first control means 20 to move the laminas 27 from the closed configuration to the open configuration and vice versa, the return being facilitated by the return spring 34.

Figure 6:
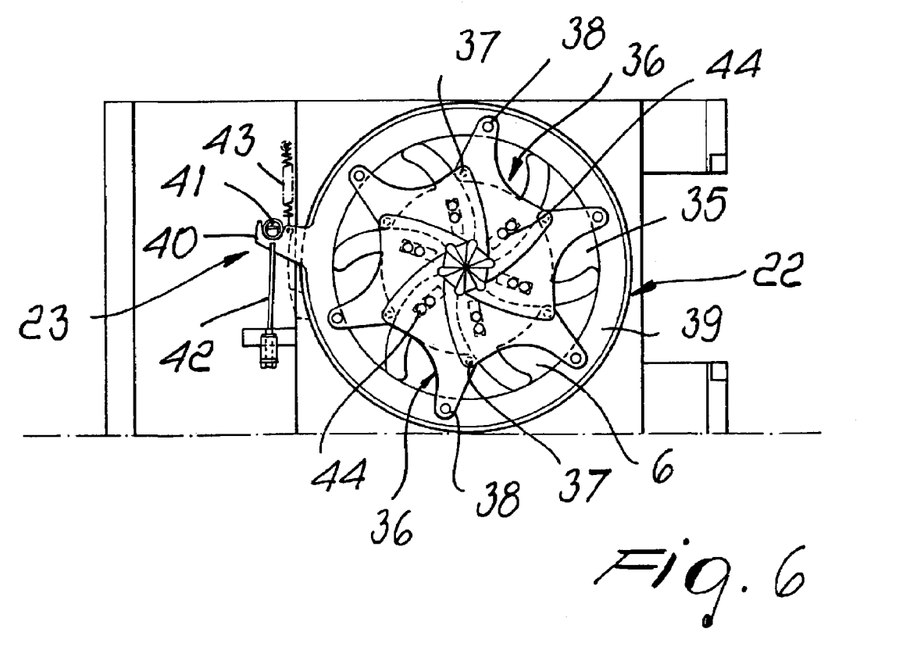
FIG. 6 is a plan view of the second shutter of the dispenser of FIG. 1 in the configuration in which the dispensing outlet is closed.
Figure 7:
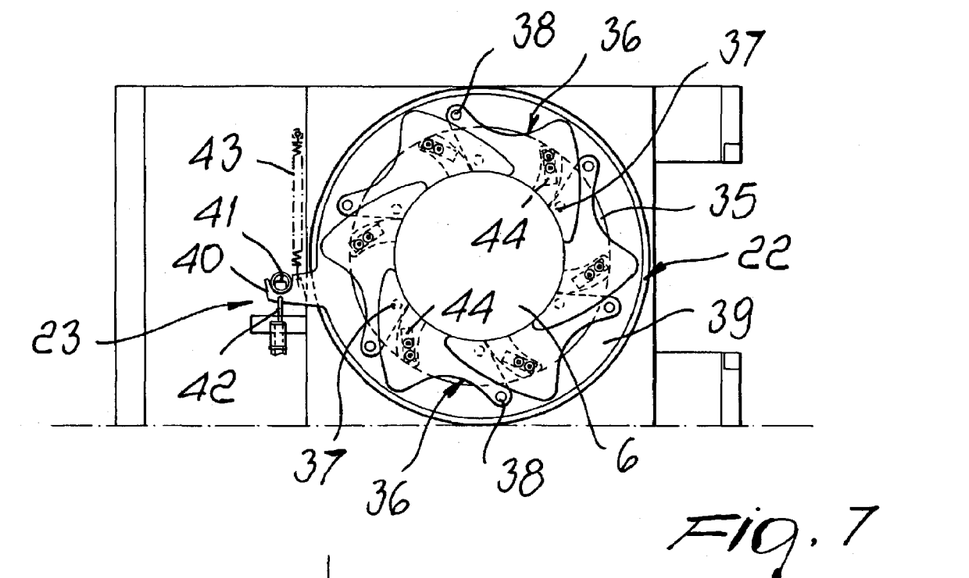
FIG. 7 is a plan view of the second shutter of the dispenser of FIG. 1 in the configuration in which the dispensing outlet is open.

The second shutter 22 is constituted by a disk 35, which is arranged at the dispensing outlet 6 and supports a plurality of contoured laminar elements 36, which are distributed along it so as to be mutually substantially coplanar, each laminar element being articulated thereto about a respective rotation pivot 37.

Each laminar element 36 is further provided with an actuation pivot 38, which is pivoted to a ring 39 that is pivotally and coaxially associated on the disk 35.

The rotation of the ring 39 moves the free end of the laminar elements 36.

In the closed configuration, the laminar elements 36 are turned so that their free end is directed toward the center of the disk 35 and of the ring 39, so as to close the dispensing outlet 6 at least partially; in the open configuration, the laminar elements 36 are moved away from the center of the disk 35 and of the ring 39 for the passage of the singled portion P' from the dispensing outlet 6 to the filter holder F.

The second control means 23 are of the type of a lever mechanism constituted by a lever 40, which is rigidly coupled to the ring 39 and is coupled to the terminal 41 of a traction cable 42 and to the end of a respective return spring 43.

The second actuation means 24 can be constituted by linear actuators of the type with electromagnets or with electric servomotors and/or can comprise step motors that act on the second control means 23 in order to turn the ring 39 and move the laminar elements 36 from the closed configuration to the open configuration and vice versa, return being facilitated by the return spring 43.

The software implemented in the control unit L has suitable timers for regulating the opening and closure of the shutters.

Conveniently, the lower surface of each laminar element 36 monolithically supports respective pusher means, which are constituted by wedges 44 that are suitable to push the singled portion P" that exits from the dispensing outlet 6 into the filter holder F when the second shutter 22 passes from the open configuration to the closed configuration.

The surface 17 of the distribution assembly 5 has straight guides 45 for moving the filter holder F, inside which the singled portion P" has been dispensed, away from the dispensing outlet 6.

The entry guides 18 and the removal guides 45 are formed on planes of arrangement that are mutually inclined and incident proximate to the dispensing outlet 6; in particular, the first guides are substantially horizontal, while the second guides, starting from the dispensing outlet 6, are inclined downward and toward the outside of the dispenser 1.

Proximate to the dispensing outlet 6 there are means for stopping the filter holder F, which are suitable to prevent it from moving away along the entry guides 18; said means are constituted by a pair of detents 46, which are arranged laterally to the entry guides 18, each detent having one end that is pivotally associated with the surface 17 about an axis that is substantially perpendicular thereto and is formed by a pivot 47 and in contrast with elastic pusher means 48, and an opposite end that is free.

The two detents 46 are normally in an inclined and converging configuration between the entry guides 18; under the thrust of the filter holder F, which enters along said guides, they oscillate outward in a configuration that is substantially aligned with the entry guides 18 in order to allow the passage of the filter holder F toward the dispensing outlet 6.

Once said filter holder is at the dispensing outlet 6, the two detents 46 return, under the action of the elastic pusher means 48, to their inclined configuration, preventing by forming an obstacle the extraction of the filter holder F along the entry guides 18.

Figure 8:
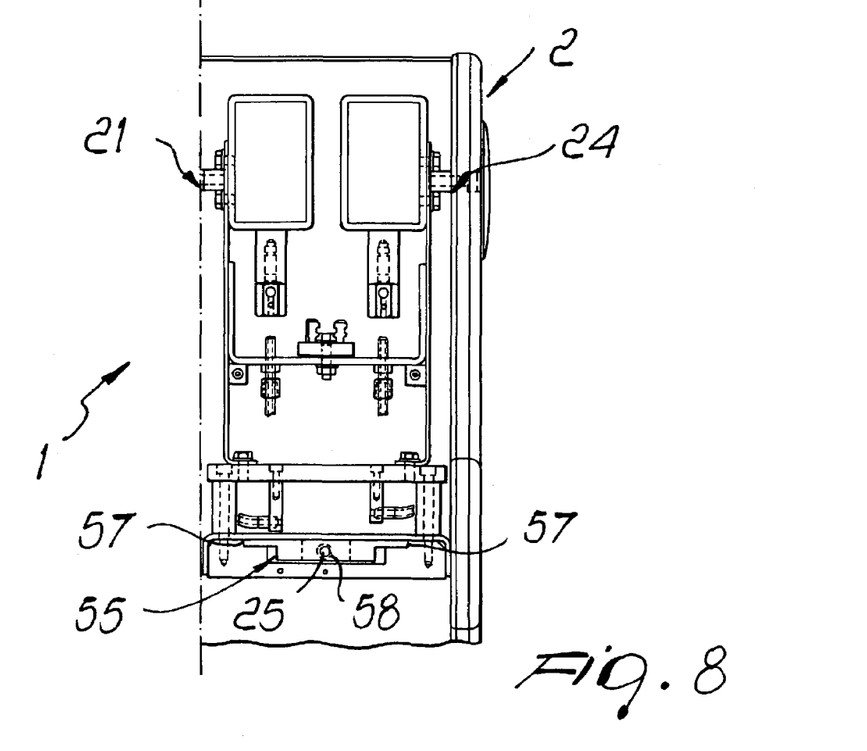
FIG. 8 is a schematic front view of the dispenser of FIG. 1.

A bridge 49, provided with a portion 50 of straight guides, is arranged below the dispensing outlet 6 and is associated so that it can move with respect to the surface 17 between first and second configurations for connecting the portion 50 respectively to the straight entry guides 18 and to the inclined removal guides 45.

The bridge 49 is constituted by an arm 51, which is pivoted to the support 9 about an axis that is substantially parallel to the surface 17 and is formed by a pivot 52; at one end of the arm 51 there is the portion 50, while elastic return means 53 are stretched between its opposite end and the base 8.

In order to be able to disengage the filter holder F associated with the dispensing outlet 6 from which it has received the singled portion P''' and extract it from the dispenser 1, it is necessary to push it downward, making the bridge 49 oscillate so that the portion 50 aligns with the removal guides 45.

After moving the filter holder F away, the reaction of the elastic return means 53 returns the bridge 49 to the configuration in which the portion 50 is aligned with the entry guides 18 in order to receive another filter holder F.

In the surface 17 there is a receptacle 54 for accommodating the first feeler 25.

The distribution assembly 5 further comprises a third shutter constituted by a plate-like slider 55, which is arranged below the second shutter 22 and is associated, so as to slide in contrast with elastic return means 56 and along respective sliding guides 57, which are formed in a straight line on the surface 17 and are substantially parallel to the entry guides 18, between a configuration for sealing the dispensing outlet 6 and a configuration for accessing it.

The slider 55 slides from the configuration for sealing the dispensing outlet 6 to the configuration for accessing it under the thrust of the filter holder F.

Advantageously, in the slider 55 there is a receptacle 58 for inserting the first feeler 25.

The slider 55 constitutes an additional safety barrier for operators, protecting their hands against accidental insertion in the first and second shutters 19 and 22, and also acts as a barrier for isolating the portions P in order to preserve their organoleptic properties and hygiene.

Figures 9, 10:
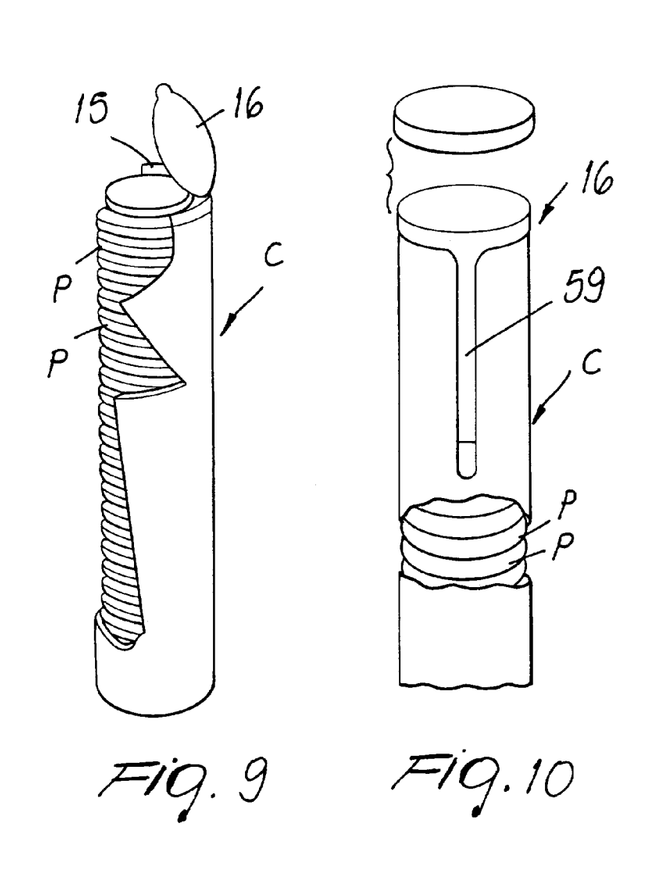
FIG. 9 is an axonometric view of a container of single-use portions of the dispenser according to the invention.
FIG. 10 is a schematic axonometric view of an alternative embodiment of a container of single-use portions of the dispenser according to the invention.

The container C is shaped like a tubular body, inside which the portions P are mutually stacked; the film 16 is associated with the end at which the opening 15 is provided and has a tab that allows to remove it by peeling.

The film 16 is removed from the opening 15 before the container C is placed in the dispenser 1; in this case, the support 14, removed from the dispenser 1 and with the discharge outlet 4 closed by the first shutter 19, is fitted onto the container C, which is arranged so that the opening 15 is open and faces upward.

The block constituted by the container C closed by the support 14 is turned upside down and fitted in the dispenser 1; the second feeler 26 detects the presence of the support 14.

Figure 11:
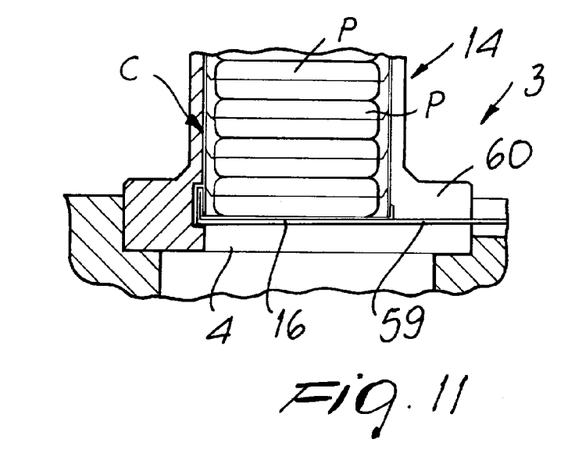
FIG. 11 is a schematic sectional view of a detail of an alternative embodiment of the storage assembly of the dispenser of FIG. 1.
Figure 12:
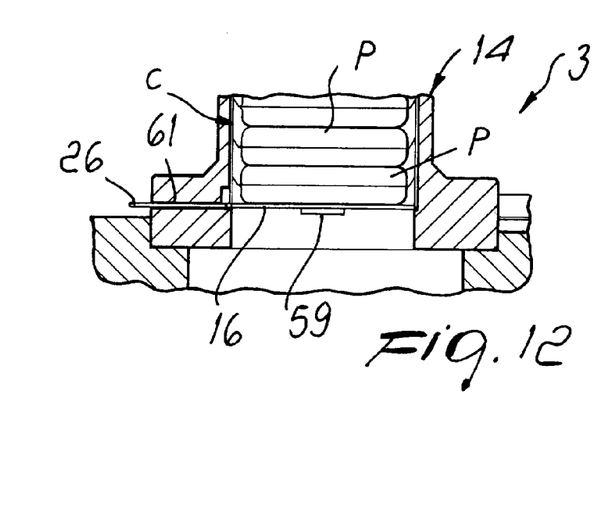
FIG. 12 is a schematic sectional view of a detail of the storage assembly of FIG. 11.

In a possible alternative embodiment, shown in FIGS. 10 to 12, the film 16 is extended by a tab 59, which is made to partially adhere along a side of the container C, allowing to remove said film even after fitting the container C on the dispenser 1.

When the container C is fitted, the tab 59 is folded onto the film 16 and the container C is inserted in the support 14, which remains anchored to the plate 13.

The support 14 comprises a notch 60 for external access in order to grip the tab 59 thus folded in order to allow to remove the film 16 by peeling after fitting the container C, and a receptacle 61 for the second feeler 26, which in this case detects the presence of the container C.

The operation of the invention is as follows:

The second feeler 26 sends to the control unit L the signal that indicates the presence of the support 14 or of the container C.

If the filter holder F is not present, the control unit L, having received the signal from the second feeler 26, activates for the first time the first actuation means 21 in order to move the first shutter 19 from the closed configuration to the open configuration and vice versa; in this manner, the portion P' slides through the discharge outlet 4, is singled and isolated from the remaining stack of the container C, and is arranged between the first and second shutters 19 and 22, ready for the first dispensing of the dispenser 1.

The filter holder F is inserted in the dispenser 1 along the entry guides 18; under its thrust, the slider 55 moves away from the dispensing outlet 6, leaving exposed the second shutter 22; when the filter holder F arrives at said second shutter, the first feeler 25 reports its presence to the control unit L.

Initially, the control unit L activates the second actuation means 24 in order to move the second shutter 22 from the closed configuration to the open configuration and vice versa, so that the singled and isolated portion P'' slides through the dispensing outlet 6 and falls into the filter holder F.

The control unit L activates the lighting of a luminous indicator, which reports to the operator that the dispensing cycle has ended.

Extracting the filter holder F that contains the portion P''' requires the voluntary intervention of the operator, who must apply thereto a downward thrust so as to be able to align the portion 50 with the removal guides 45.

The slider 55 returns below the second shutter 22 and the dispenser 1 is ready for a new dispensing operation, since the control unit L, at a later time, has activated the first actuation means 21 so as to move the first shutter 19 from the closed configuration to the open and vice versa; in this manner, the next portion P' slides through the discharge outlet 4, is singled and isolated from the remaining stack of the container C, and is arranged between the first and second shutters 19 and 22, ready for the next dispensing of the dispenser 1.

It is noted that the above cited figures illustrate a modular portion of the dispenser 1 that can be repeated in series.

With reference to the second embodiment of the dispenser 1, shown in FIGS. 13 to 17, the transfer means 7 are allowed to move alternately between the storage assembly 3 and the distribution assembly 5 and allow to remove the portions P from the discharge outlet 4 and convey them at the dispensing outlet 6.

Figure 13:
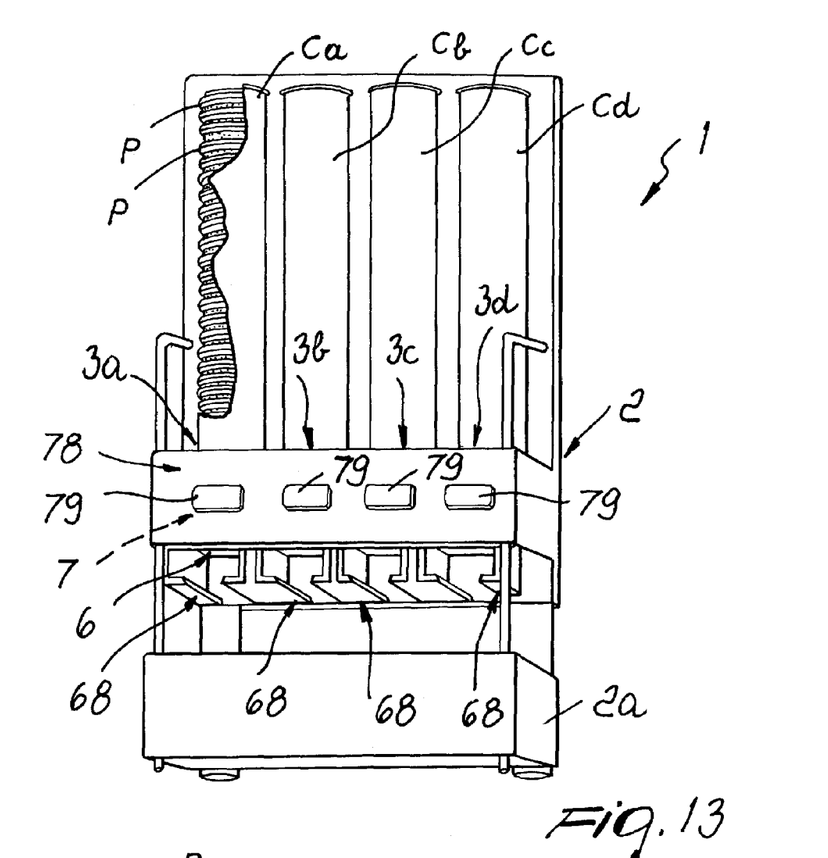
FIG. 13 is a partial schematic axonometric view of a second embodiment of the dispenser according to the invention.

The structure 2 comprises a footing 2a and a cover 2b that can be removed to allow to supply the storage assembly 3.

Figure 14:
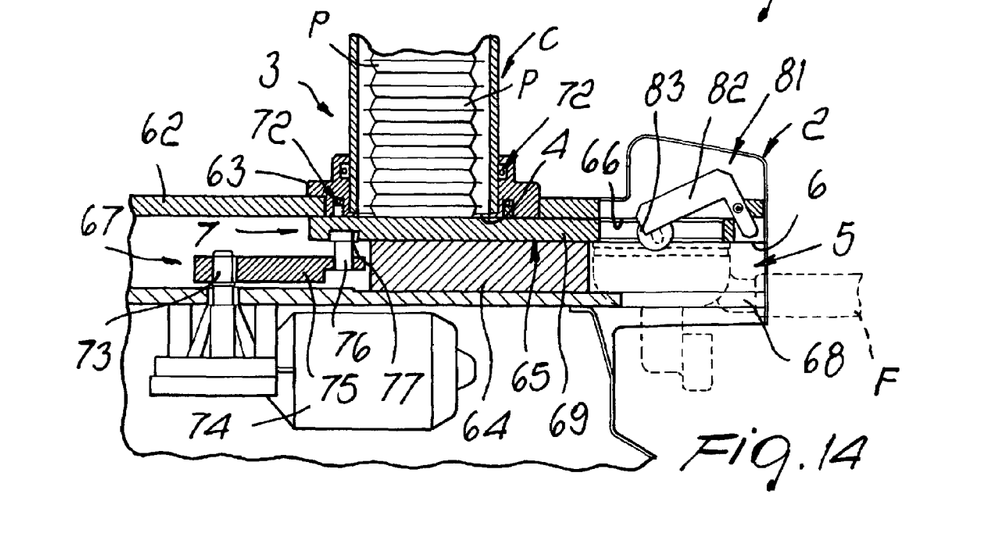
FIG. 14 is a partially sectional schematic side view of the dispenser of FIG. 13 in the discharge configuration.

The storage assembly 3 comprises a plate 62 with which a container support 63 for a container C of portions P is associated, forming the discharge outlet 4.

The distribution assembly 5 comprises a surface 64, arranged below and substantially parallel to the plate 62, which forms the dispensing outlet 6.

The transfer means 7 comprise a flat element 65, which is interposed between the plate 62 and the surface 64 and provided with a through hole 66.

Figure 15:
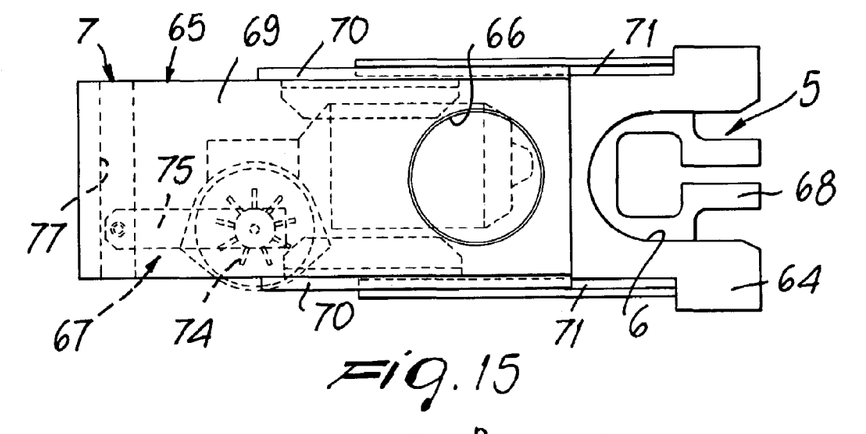
FIG. 15 is a partial and schematic plan view of the dispenser of FIG. 13 in the withdrawal configuration.

The flat element 65 is associated with actuation means 67 that are adapted to move it alternately between a withdrawal configuration, in which the hole 66 is arranged at the discharge outlet 4, so as to receive a portion P, and a discharge configuration, in which the hole 66 is arranged at the dispensing outlet 6, so as to release the withdrawn portion P.

At the dispensing outlet 6, externally to the structure 2, there is a support 68 for a filter holder F of a coffee machine that operates by means of the portions P.

The flat element 65 is constituted by a carriage 69, which is interposed between the plate 62 and the surface 64 and is rigidly coupled to two sliding elements 70, such as sliding blocks, which are arranged longitudinally below the carriage 69 and are associated with respective straight guides 71 that are associated with the structure 2.

Conveniently, the discharge outlet 4 and the dispensing outlet 6 are spaced by a pitch that is greater than, or equal to, the diameter of the hole 66 or the maximum dimension thereof, so as to prevent direct connection between said outlets.

Furthermore, the carriage 69 has a thickness that is equal to the distance between the plate 62 and the surface 64 and substantially coincides with the thickness of each portion P, so as to avoid infiltrations of air or other matter and allow individual withdrawals from the container C.

The container support 63 has sealing elements 72 that are suitable to prevent infiltrations of air inside the container C.

The actuation means 67 are suitable to transmit to the carriage 69 a reciprocating translational motion between the withdrawal and discharge configurations.

In the particular embodiment described, the actuation means 67 are of a motorized type, but alternative embodiments in which the actuation means are of the mechanical type, for example a lever system, rather than of the fluid-operated type, for example a system comprising fluid-operated actuators, or others, are also possible.

Figure 16:
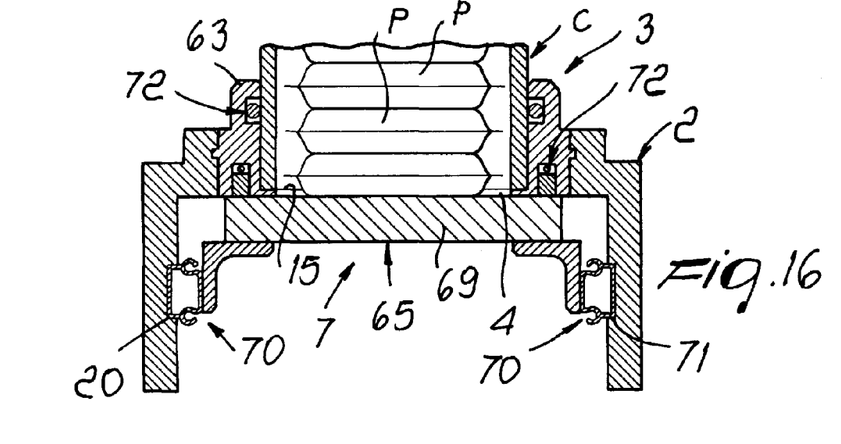
FIG. 16 is a partially sectional schematic front view of the dispenser of FIG. 13.

The actuation means 67 comprise a driving shaft 73, which is associated with a motor 74, and a crank 75, in which one end is keyed to the shaft 73 and the opposite end is associated with a pivot 76 that can slide in a slot 77 that is arranged transversely to the direction of motion and is formed on the lower surface of the portion of carriage 69 that protrudes outside the surface 64.

The dispenser 1 comprises control means 78 for the actuation means 67, such as a button 79 or a lever 80 for actuation, which are arranged outside the structure 2 and are accessible to a user; said means actuate the starting of the motor 74.

The dispenser 1 comprises pushers 81, which cooperate with the carriage 69 and are suitable to push a portion P that is picked up and accommodated in the hole 66 toward the dispensing outlet 6 when the carriage 69 is in the discharge configuration.

The pushers 81 comprise an oscillating arm 82 that is arranged above the carriage 69 at the dispensing outlet 6 and has an end that is associated with a pad 83 and an opposite end that is pivoted to the structure 2 with interposed contrast means, for example elastic contrast means, which are not shown because they are of a known type and are suitable to keep the arm 82 lowered so as to ensure contact between the pad 83 and the removed portion P when the carriage 69 is in the discharge configuration.

The structure 2 of the dispenser 1 shown in FIG. 13 comprises four storage assemblies 3a, 3b, 3c and 3d, which are arranged side by side and are provided with corresponding outlets 4.

Each storage assembly 3a, 3b, 3c and 3d accommodates a respective container Ca, Cb, Cc and Cd of portions P.

Advantageously, each container Ca, Cb, Cc and Cd can accommodate portions P of preparations for different beverages.

Under each storage assembly 3a, 3b, 3c and 3d there are respective transfer means 7 and respective distribution assemblies 5 that form the corresponding dispensing outlets 6.

At each dispensing outlet 6 there are corresponding supports 68a, 68b, 68c and 68d associated with the structure 2.

For the actuation of the various actuation means 67 there are suitable respective buttons 79a, 79b, 79c and 79d.

Figure 17:
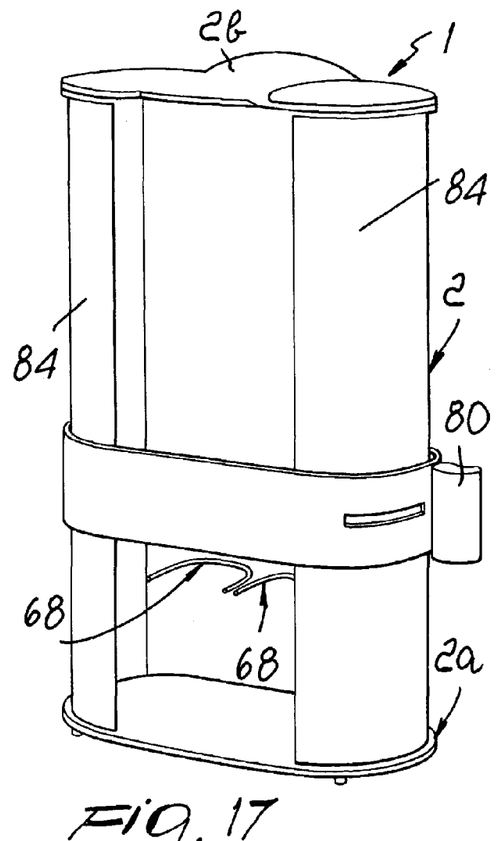
FIG. 17 is a partial schematic axonometric view of an alternative embodiment of the dispenser of FIG. 13.

In the embodiment of FIG. 17, the dispenser 1 comprises two storage assemblies 3, each constituted by a respective compartment 84 for accommodating a pair of containers C; said compartment can rotate and is provided with a respective discharge outlet 4.

The container C arranged at the discharge outlet 4 is in use, while the other one acts as a reserve.

When the portions P inside the container C being used are depleted, the compartment 84 is turned, placing the other container C at the discharge outlet 4, so that the dispenser 1 lasts twice as long as the first embodiment of the invention.

The operation of the invention is as follows: to insert the containers C in the storage assembly 3, the cover 2b is removed and the container C is inserted, with the opening 15 directed downward, at the support 63.

After positioning the filter holder F on the support 68, the button 79 that activates the actuation of the motor 74 is operated, turning the crank 75 that moves the carriage 69.

When the carriage 69 is in the withdrawal configuration, the portion P arranged in a lower region inside the container C, due to its own weight, slides inside the hole 66 and is moved by the carriage 69 along the surface 64 until, at the discharge configuration, it is pushed by the pad 83 through the dispensing outlet 6 and falls into the filter holder F.

Then the filter holder F is arranged inside a coffee machine, which dispenses hot water in order to obtain the required beverage.

In practice it has been found that the described invention achieves the intended aim and objects.

The invention thus conceived is susceptible of numerous modifications and variations, all of which are within the scope of the appended claims.

All the details may further be replaced with other technically equivalent ones.

In practice, the materials used, as well as the shapes and dimensions, may be any according to requirements without thereby abandoning the protective scope of the appended claims.

The disclosures in Italian Patent Applications No. MO2002A000022 and No. MO2002A000354 from which this application claims priority are incorporated herein by reference.

What is claimed is:

1. A dispenser of single-use portions of preparations for beverages, comprising: a support structure that supports at least one storage assembly supported at said support structure, for storing single-use portions, said storage assembly being provided with a discharge outlet for said portions; at least one distribution assembly for distributing said portions; which is provided with a dispensing outlet for dispensing said portions; and transfer means for transferring the portions from said discharge outlet to said dispensing outlet, said transfer means being interposed between said storage assembly and said distribution assembly, said transfer means comprising: a first shutter for said discharge outlet; first actuation means for actuating said first shutter to move alternately from a closed configuration to an open configuration; a second shutter for said dispensing outlet; second actuation means for actuating said second shutter to move alternately from a closed configuration to an open configuration; and an electronic control and driving unit that controls said first and second actuation means, the dispenser assuming an inactive configuration, in which said first and second shutters are both in the closed configuration, and an active configuration, in which said first and second shutters are actuated alternately and selectively at different times between the respective closed and open configurations and vice versa, to dispense singled portions.

2. The dispenser of claim 1, wherein said distribution assembly is arranged below said storage assembly and said transfer means are interposed between said storage assembly and said distribution assembly.

3. The dispenser of claim 1, comprising: a collecting device for collecting the portions and first sensing means for sensing and detecting presence, proximate to said dispensing outlet, of said device for collecting said portions, said first means being functionally associated with said control unit.

4. The dispenser of claim 3, wherein said storage assembly comprises at least one container for said portions and a support for said at least one container, in which said discharge outlet is provided, said at least one container being provided with an opening that is arrangeable at said discharge outlet.

5. The dispenser of claim 4, further comprising second sensing means for sensing and detecting presence, proximate to said discharge outlet, of any of said support and of said at least one container, said second sensing means being functionally associated with said control unit.

6. The dispenser of claim 5, wherein said first shutter comprises at least one lamina, which is arranged below said discharge outlet and is pivotally associated, about an axis that is substantially perpendicular thereto, with said structure, to move between said closed configuration, in which the first shutter is arranged at the discharge outlet so as to close the discharge outlet at least partially, and said open configuration, in which the first shutter is spaced from said discharge outlet for the passage through said discharge outlet of a singled one of said portions.

7. The dispenser of claim 6, wherein said first shutter comprises two of said laminas, arranged mutually symmetrical and substantially co-planar with respect to each other.

8. The dispenser of claim 6, wherein said second shutter comprises: a disk, which is arranged at said dispensing outlet; a ring that is pivotally associated and coaxial on the disk, and a plurality of contoured laminar elements supported at said disk, said laminar elements being distributed, so as to be mutually substantially co-planar, along said disk, with each said laminar element provided with a respective rotation pivot for articulation to said disk and with an actuation pivot that is pivoted to said ring, rotation of the ring producing movement of the laminar elements between a closed configuration, in which the laminar elements are rotated with free end thereof directed toward a center of the disk so as to close the dispensing outlet at least partially, and an open configuration, in which the laminar elements are spaced from the center of the disk for allowing passage of singled portions through the dispensing outlet.

9. The dispenser of claim 1, wherein at least one of said first and second actuation means comprises linear actuators.

10. The dispenser of claim 9, wherein said linear actuators are of a type that comprises any of electromagnets, electric servomotors, and other electric actuators.

11. The dispenser of claim 1, wherein at least one of said first and second actuation means comprises motor means of the step-motor type.

12. The dispenser of claim 1, comprising first control means and second control means, which are interposed, respectively, between said first actuation means and said first shutter and between said second actuation means and said second shutter.

13. The dispenser of claim 12, wherein at least one of said first and second control means comprises a lever system.

14. The dispenser of claim 5, wherein at least one of said first and second sensing and indication means comprises a feeler for sensing contact, respectively, of any of said collection device, and of said container, and said support.

15. The dispenser of claim 5, wherein at least one of said first and second sensing and indication means comprises a magnetic proximity sensor.

16. The dispenser of claim 8, comprising pushing means for pushing a singled portion that exits from said dispensing outlet into said collection device, said pusher means being associated, in a lower region, with said second shutter.

17. The dispenser of claim 16, wherein said pusher means comprises at least one wedge that is monolithically associated with a lower surface of at least one of said laminar elements to push said singled portion into said collection device.

18. The dispenser of claim 8, wherein said distribution assembly comprises a surface in which said dispensing outlet is provided, said surface being provided with straight entry guides for entry of said collection device toward said dispensing outlet and with straight removal guides for moving said collection device away from said dispensing outlet, said guides being formed on planes of arrangement that are inclined one with respect to the other, and incident proximate to the dispensing outlet.

19. The dispenser of claim 18, wherein said distribution assembly comprises stop means for stopping said collection device which are arranged proximate to said dispensing outlet to prevent movement of said collection device along said straight entry guides.

20. The dispenser of claim 19, wherein said stop means comprise elastic pusher means, and at least one detent that is arranged proximate to said straight entry guides and is pivotally associated with said surface, about an axis that is substantially perpendicular thereto and in contrast with said elastic pusher means, between an aligned configuration and an inclined configuration that converges toward said straight entry guides, respectively, for entry and stopping of the collection device.

21. The dispenser of claim 20, wherein said distribution assembly comprises a bridge that has a portion of straight guides, is arranged below said dispensing outlet and is arranged so as to move with respect to said surface between a first configuration and a second configuration for connecting said portion respectively to said straight entry guides and to said straight removal guides.

22. The dispenser of claim 21, wherein said bridge comprises elastic return means, and an arm that is arranged below said surface and is pivoted, about an axis that is substantially parallel thereto and in contrast with said elastic return means, between said first and second connection configurations.

23. The dispenser of claim 18, wherein said surface comprises a receptacle for accommodating said first sensing and indication means.

24. The dispenser of claim 19, wherein said distribution assembly comprises respective straight sliding guides formed in said surface, elastic return means and a third shutter, which is arranged below said second shutter and is slidingly associated, in contrast with said elastic return means and along said straight sliding guides, between a configuration for sealing the dispensing outlet and a configuration for access thereto.

25. The dispenser of claim 24, wherein said third shutter is constituted by a plate-like slider that is slidingly actuated between said sealing configuration and said access configuration by entry thrust of said collection device, said straight sliding guides being substantially parallel to said straight entry guides.

26. The dispenser of claim 15, wherein said third shutter comprises a receptacle for the insertion of said first sensing and indication means.

27. The dispenser of claim 1, wherein said container comprises a tubular body, inside which said portions are mutually stacked, and which has an end that is provided with said exit opening, and a removable closure element provided at said exit opening.

* * * * *